United States Patent
Mutnuru (10) Patent No.: US 10,567,288 B1
(45) Date of Patent: Feb. 18, 2020

(54) AUTOMATIC DISCOVERY, SCALING, AND LOAD BALANCING OF MULTIPLE CLOUD DATA CENTERS IN A SOFTWARE-DEFINED NETWORK ENVIRONMENT

(71) Applicant: Juniper Networks, Inc., Sunnyvale, CA (US)

(72) Inventor: Rishi K. Mutnuru, Santa Clara, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 297 days.

(21) Appl. No.: 15/823,906

(22) Filed: Nov. 28, 2017

(51) Int. Cl.
*H04L 12/803* (2013.01)
*H04L 12/24* (2006.01)
(Continued)

(52) U.S. Cl.
CPC ........ *H04L 47/125* (2013.01); *G06F 9/45558* (2013.01); *H04L 41/042* (2013.01); *H04L 41/0893* (2013.01); *H04L 41/12* (2013.01); *H04L 61/1511* (2013.01); *H04L 67/1004* (2013.01); *H04L 67/1025* (2013.01)

(58) Field of Classification Search
CPC . H04L 47/125; H04L 41/042; H04L 41/0893; H04L 41/12; H04L 61/1511; H04L 61/1004; H04L 67/1025; G06F 9/45558
See application file for complete search history.

(56) References Cited

U.S. PATENT DOCUMENTS 8,693,374 B1 4/2014 Murphy et al.
2013/0329548 A1 12/2013 Nakil et al.
(Continued)

FOREIGN PATENT DOCUMENTS

EP 2854347 A2 4/2015
WO 2013184846 A1 6/2013

OTHER PUBLICATIONS

"ETSI GS NFV-MAN 001 V1.1.1—Network Functions Virtualisation (NFV); Management and Orchestration," European Telecommunications Standards Institute, ETSI GS NFV-MAN 001 v1.1.1, Dec. 2014, 184 pp.
(Continued)

*Primary Examiner* — Ronald B Abelson
(74) *Attorney, Agent, or Firm* — Shumaker & Sieffert, P.A.

(57) ABSTRACT

In general, techniques are disclosed for automatic discovery and load balancing of virtual service instances of a plurality of cloud data centers within a Software Defined Networking (SDN) or a Network Functions Virtualization (NFV) environment. In one example, a global load balancing device (GLB) of a first cloud data center receives, from an SDN controller, address information for a first set of virtual service instances provided by the first cloud data center and a hostname of a domain for which to perform load balancing across the plurality of cloud data centers. The GLB device requests, from a domain name server (DNS) for the domain, address information for other sets of virtual service instances provided by other cloud data centers. Further, the GLB device applies a load balancing algorithm to direct network traffic to one or more of the virtual service instances provided by the plurality of cloud data centers.

30 Claims, 6 Drawing Sheets

(51) Int. Cl.
  *H04L 29/12* (2006.01)
  *H04L 29/08* (2006.01)
  *G06F 9/455* (2018.01)

(56) References Cited

U.S. PATENT DOCUMENTS

| | | | |
|---|---|---|---|
| 2014/0241247 | A1 | 8/2014 | Kempf et al. |
| 2014/0304414 | A1 | 10/2014 | Yengalasetti et al. |
| 2015/0029849 | A1 | 1/2015 | Frost et al. |
| 2015/0092551 | A1 | 4/2015 | Moisand et al. |
| 2015/0146536 | A1 | 5/2015 | Minei et al. |
| 2015/0149812 | A1 | 5/2015 | Arisoylu et al. |
| 2016/0139939 | A1 | 5/2016 | Bosch et al. |
| 2017/0086115 | A1* | 3/2017 | Chung .................. H04W 36/14 |
| 2017/0366452 | A1 | 12/2017 | Moisand et al. |
| 2018/0006935 | A1 | 1/2018 | Mutnuru et al. |

OTHER PUBLICATIONS

"Contrail Architecture," White Paper, Juniper Networks, Inc., Sep. 2015, 44 pp.

"Enabling Solutions in Cloud Infrastructure and for Network Functions Virtualization," White Paper, Juniper Networks, Inc., Feb. 2015, 16 pp.

U.S. Appl. No. 14/228,706, by Juniper Networks Inc., (Inventors: Moisand et al.), filed Mar. 28, 2014.

Fernando et al., "Service Chaining using Virtual Networks with BGP VPNs, draft-ietf-bess-service-chaining-00," Internet-Draft, BGP Enabled Services (bess), Apr. 13, 2016, 41 pp.

Rekhter, "IPv6 Address Specific BGP Extended Community Attribute," RFC 5701, Network Working Group, Nov. 2009, 5 pp.

Scudder et al., "Capabilities Advertisement with BGP-4," RFC 5492, Network Working Group, Feb. 2009, 7 pp.

Sangli, "BGP Extended Communities Attribute," RFC 4360, Network Working Group, Feb. 2006, 12 pp.

Rosen et al., "IANA Registries for BGP Extended Communities," RFC 7153, Internet Engineering Task Force (IETF), Mar. 2014, 16 pp.

Fernando et al., "Service Chaining using Virtual Networks with BGP VPNs, draft-ieff-bess-service-chaining-00," Internet-Draft, BGP Enabled Services (bess), Apr. 13, 2016, 41 pp.

* cited by examiner

AUTOMATIC DISCOVERY, SCALING, AND LOAD BALANCING OF MULTIPLE CLOUD DATA CENTERS IN A SOFTWARE-DEFINED NETWORK ENVIRONMENT

TECHNICAL FIELD

The disclosure relates to computer networks and, more specifically, to network services in computer networks.

BACKGROUND

A computer network is a collection of interconnected computing devices that can exchange data and share resources. In a packet-based network, the computing devices communicate data by dividing the data into small blocks called packets, which are individually routed across the network from a source device to a destination device. Certain devices, referred to as routers, operate within a computer network to maintain routing information that describes routes through the network. A "route" can generally be defined as a path between two locations on the network. Routers include a control plane that maintains the routing information, and a data plane that forwards received packets according to the routing information.

Network service providers provide services to subscribers such as security, tunneling, virtual private networks, filtering, load balancing, VoIP/Multimedia processing and various types of application proxies (HTTP, XML, WAP, etc.) to incoming packets. Service providers also provide content-specific services designed to improve the quality of a user's experience, for example, video streaming and caching.

In some examples, numerous cloud data centers implement the network infrastructure of the network service provider. For example, each cloud data center may provide a large collection of interconnected servers that provide computing (e.g., compute nodes) and/or storage capacity to run various network service applications. Each cloud data center may comprise a facility that hosts applications and services for the subscribers. The cloud data center for example, hosts all of the infrastructure equipment, such as networking and storage systems, redundant power supplies, and environmental controls. In a typical data center, clusters of storage systems and application servers are interconnected via high-speed switch fabric provided by one or more tiers of physical network switches and routers. More sophisticated data centers provide infrastructure that is spread throughout the world with subscriber support equipment located in various physical hosting facilities. These application servers typically execute various protocols and exchange signaling messages to anchor and manage subscriber sessions and communication flows associated with subscriber devices.

A software defined networking (SDN) controller and/or a network functions virtualization (NFV) orchestrator may be included in the network architecture to provide centralized control of the subscriber sessions and communication flows within the service provider network. An SDN architecture is often used to provide at least a degree of separation of the control plane and the data plane in network devices, and the abstraction of the control plane into a more modular and layered architecture. An NFV architecture provides virtualization to remove dependency on specialized hardware and to consolidate many different network equipment types onto industry standard high volume servers, switches and storage, which may be located in data centers, network nodes and in end user premises.

SUMMARY

In general, the disclosure describes techniques for automatic discovery, scaling, and load balancing of a plurality of virtual service instances of a plurality of cloud data centers within an SDN/NFV environment. Each cloud data center may deploy a plurality of virtual service instances as virtual machines (VMs) or other virtual entities hosted on one or more physical devices, e.g., servers, to offer individual services or chains of services from a service provider. The use of virtual service instances enables automatic scaling (i.e., instantiating or tearing down) of the services on-demand. According to the techniques of the disclosure, each cloud data center of the plurality of cloud data centers includes a global load balancing (GLB) device. The techniques of this disclosure enable each GLB device to automatically discover virtual service instances provided by the plurality of cloud data centers, perform automatic load balancing of the services across the plurality of cloud data centers providing the virtual service instances, and enable automatic scaling of the virtual service instances across the plurality of cloud data centers. In one example, the GLB device of a respective cloud data center automatically discovers virtual service instances for each other cloud data center of the plurality of cloud data centers based on information received from an SDN controller for the SDN/NFV environment and a domain name server (DNS) device for the SDN/NFV environment. Further, the GLB device of a respective cloud data center receives, from the SDN controller, configuration information specifying a traffic load balancing algorithm for the virtual service instances. The GLB device of the respective cloud data center updates a load balancing group for a given network service to include the virtual service instances of the other discovered cloud data centers on which to load balance traffic for the network service. In this way, the disclosed techniques provide for automatic discovery, automatic scaling, and automatic load balancing of virtual service instances for a plurality of cloud data centers in an SDN/NFV environment.

In one example, this disclosure describes a method comprising: receiving, by a global load balancing (GLB) device of a first cloud data center of a plurality of cloud data centers that provide one or more virtual service instances, and from a software-defined networking (SDN) controller for a service provider network, address information for a first set of virtual service instances provided by the first cloud data center of the plurality of cloud data centers; receiving, by the GLB device and from the SDN controller, a hostname of a domain for which to perform load balancing across the plurality of cloud data centers; requesting, by the GLB device and from a domain name server (DNS) for the domain, address information for other sets of virtual service instances provided by other cloud data centers of the plurality of cloud data centers; and applying, by the GLB device, a load balancing algorithm to network traffic for the one or more of the virtual service instances provided by the plurality of cloud data centers.

In another example, this disclosure describes a method comprising: transmitting, by a software-defined networking (SDN) controller for a service provider network and to a global load balancing (GLB) device of a first cloud data center of a plurality of cloud data centers that provide one or more virtual service instances, address information for a first set of virtual service instances provided by the first cloud data center of the plurality of cloud data centers; transmitting, by the SDN controller and to the GLB device, a hostname of a domain for which to perform load balancing across the plurality of cloud data centers; and transmitting, by the SDN controller and to the GLB device, a load balancing algorithm for applying to network traffic for the one or more of the virtual service instances provided by the plurality of cloud data centers.

In another example, this disclosure describes a global load balancing (GLB) device of a first cloud data center of a plurality of cloud data centers that provide one or more virtual service instances configured to: receive, from a software-defined networking (SDN) controller for a service provider network, address information for a first set of virtual service instances provided by the first cloud data center of the plurality of cloud data centers; receive, from the SDN controller, a hostname of a domain for which to perform load balancing across the plurality of cloud data centers; request, from a domain name server (DNS) for the domain, address information for other sets of virtual service instances provided by other cloud data centers of the plurality of cloud data centers; and apply a load balancing algorithm to network traffic for the one or more of the virtual service instances provided by the plurality of cloud data centers.

In another example, this disclosure describes a software-defined networking (SDN) controller for a service provider network configured to: transmit, to a global load balancing (GLB) device of a first cloud data center of a plurality of cloud data centers that provide one or more virtual service instances, address information for a first set of virtual service instances provided by the first cloud data center of the plurality of cloud data centers; transmit, to the GLB device, a hostname of a domain for which to perform load balancing across the plurality of cloud data centers; and transmit, to the GLB device, a load balancing algorithm for applying to network traffic for the one or more of the virtual service instances provided by the plurality of cloud data centers.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1:
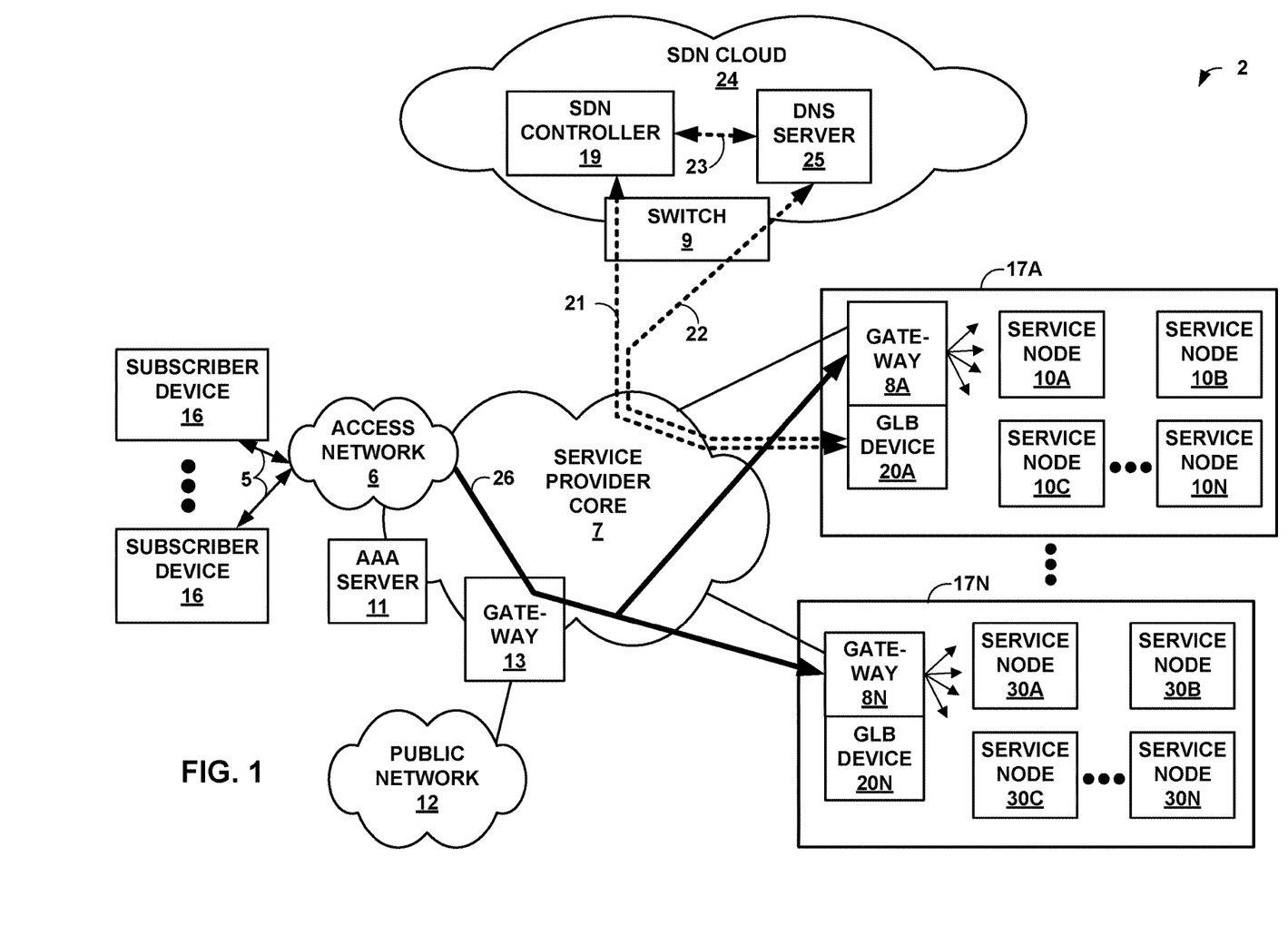
FIG. 1 is a block diagram illustrating an example network system operating in accordance with techniques described herein.

FIG. 1 is a block diagram illustrating an example network system operating in accordance with techniques described herein. The example network system of FIG. 1 includes a service provider network 2 that operates as a private network to provide packet-based network services to subscriber devices 16. That is, service provider network 2 provides authentication and establishment of network access for subscriber devices 16 such that subscriber devices 16 may begin exchanging data packets with public network 12, which may be an internal or external packet-based network such as the Internet.

In the example of FIG. 1, service provider network 2 comprises an access network 6 that provides connectivity to public network 12 via service provider core network 7 and gateway network device 13. Service provider core network 7 and public network 12 provide packet-based services that are available for request and use by subscriber devices 16. As examples, core network 7 and/or public network 12 may provide, for example, bulk data delivery, voice over Internet protocol (VoIP), Internet Protocol television (IPTV), Short Messaging Service (SMS), Wireless Application Protocol (WAP) service, or customer-specific application services. Public network 12 may comprise, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates access network 6, an enterprise IP network, or some combination thereof. In various embodiments, public network 12 is connected to a public WAN, the Internet, or to other networks. Public network 12 executes one or more packet data protocols (PDPs), such as IP (IPv4 and/or IPv6) or Point-to-Point Protocol (PPP), to enable packet-based transport of public network 12 services.

Subscriber devices 16 connect to gateway 13 via access network 6 to receive connectivity to subscriber services (e.g., services provided by service nodes 10A-10N and 30A-30N in datacenters 17A-17N) for applications hosted by subscriber devices 16. A subscriber may represent, for instance, an enterprise, a residential subscriber, or a mobile subscriber. Subscriber devices 16 may be, for example, personal computers, laptop computers or other types of computing device associated with subscribers. In addition, subscriber devices 16 may comprise mobile devices that access the data services of service provider network 2 via a radio access network (RAN). Example mobile subscriber devices 16 include mobile telephones, laptop or desktop computers having, e.g., a 3G or 4G wireless card, wireless-capable netbooks, video game devices, pagers, smart phones, personal data assistants (PDAs) or the like. Each of subscriber devices 16 may run a variety of software applications, such as word processing and other office support software, web browsing software, software to support voice calls, video games, videoconferencing, and email, among others. Subscriber devices 16 connect to access network 6 via access links 5 that comprise wired and/or wireless communication links. The term "communication link," as used herein, comprises any form of transport medium, wired or wireless, and can include intermediate nodes such as network devices. Each of access links 5 may comprise, for instance, aspects of an asymmetric DSL network, WiMAX, a T-1 line, an Integrated Service Digital Network (ISDN), wired Ethernet, or a cellular radio link.

A network service provider operates, or in some cases leases, elements of access network 6 to provide packet transport between subscriber devices 16 and gateway 13. Access network 6 represents a network that aggregates data traffic from one or more subscriber devices 16 for transport to/from service provider core network 7 of the service provider. Access network 6 includes network nodes that execute communication protocols to transport control and user data to facilitate communication between subscriber devices 16 and gateway 13. Access network 6 may include a broadband access network, a wireless LAN, a public switched telephone network (PSTN), or other type of access network, and may include or otherwise provide connectivity for cellular access networks.

Service provider core network 7 offers packet-based connectivity to subscriber devices 16 attached to access network 6 for accessing public network 12. Core network 7 may represent a public network that is owned and operated by a service provider to interconnect a plurality of networks, which may include access network 6. Core network 7 may implement Multi-Protocol Label Switching (MPLS) forwarding and, in such instances, may be referred to as an MPLS network or MPLS backbone. In some instances, core network 7 represents a plurality of interconnected autonomous systems, such as the Internet, that offers services from one or more service providers. Public network 12 may represent an edge network coupled to core network 7, e.g., by a customer edge device such as customer edge switch or router. Public network 12 may include a data center.

In examples of service provider network 2 that include a wireline/broadband access network as access network 6, access network 6 may include a Broadband Network Gateway (BNG), Broadband Remote Access Server (BRAS), MPLS Provider Edge (PE) router, core router or gateway, or a Cable Modem Termination System (CMTS), for instance. In examples of service provider network 2 that include a cellular access network as access network 6, access network 6 may include a mobile gateway, for example, a Gateway General Packet Radio Service (GPRS) Serving Node (GGSN), an Access Gateway (aGW), or a Packet Data Network (PDN) Gateway (PGW). In other examples, the functionality described above may be implemented in a switch, service card or other network element or component.

A network service provider that administers at least parts of service provider network 2 typically offers network services to subscribers associated with devices, e.g., subscriber devices 16, that access service provider network 2. Services offered may include, for example, traditional Internet access, Voice-over-Internet Protocol (VoIP), video and multimedia services, and security services. As described above with respect to access network 6, core network 7 may support multiple types of access network infrastructures that connect to service provider network access gateways to provide access to the offered services. In some instances, the network system illustrated in FIG. 1 may include subscriber devices 16 that attach to multiple different access networks 6 having varying architectures. For example, gateway 13 receives, from subscriber devices 16, network traffic flows 26 destined for public network 12. Gateway 13 redirects the traffic flows to one or more of data centers 17A-17N (collectively, "data centers 17") that provide the network services. Gateways 8A-8N (collectively, "gateways 8") for respective data centers 17 direct the received traffic flows to service nodes (e.g., service nodes 10A-10N or 30A-30N) for application of the network services. After the network services are applied to the traffic flows, gateways 8 direct the traffic flows back to service provider core 7, whereupon gateway 13 directs the traffic flows to public network 12.

In general, any one or more of subscriber devices 16 may request authorization and data services by sending a session request to Authentication, Authorization and Accounting (AAA) server 11 to authenticate the subscriber device requesting network access. Once authenticated, any of subscriber devices 16 may send subscriber data traffic toward service provider core network 7 to access public network 12, and such packets traverse service provider core 7 as part of at least one packet flow. Flows 26 illustrated in FIG. 1 represent one or more upstream packet flows from any one or more subscriber devices 16 and directed to public network 12. The term "packet flow," "traffic flow," or simply "flow" refers to a set of packets originating from a particular source device and sent to a particular destination device. A single flow of packets, in either the upstream (sourced by one of subscriber devices 16) or downstream (destined for one of subscriber devices 16) direction, may be identified by the 5-tuple: <source network address, destination network address, source port, destination port, protocol>, for example. This 5-tuple generally identifies a packet flow to which a received packet corresponds. An n-tuple refers to any n items drawn from the 5-tuple. For example, a 2-tuple for a packet may refer to the combination of <source network address, destination network address> or <source network address, source port> for the packet. Moreover, a subscriber device 16 may originate multiple packet flows upon authentication to service provider network 2 and establish a communication session for receiving network services from service nodes 10 or 30 of data centers 17.

As described herein, service provider network 2 includes a plurality of data centers 17 having a cluster of service nodes that provide an execution environment for the network services. For example, data center 17A includes service nodes 10A-10N (collectively, service nodes 10) that provide a network service. As a further example, data center 17N includes service nodes 30A-30N (collectively, service nodes 30) that provide another network service that may be the same as or different from the network service provided by service nodes 10. That is, each of service nodes 10 and 30 applies one or more services to flows 26. As examples, service nodes 10 or 30 may apply firewall and security services, carrier grade network address translation (CG-NAT), media optimization (voice/video), IPSec/VPN services, deep packet inspection (DPI), HTTP filtering, counting, accounting, charging, and load balancing of packet flows or other types of services applied to network traffic. In this way, each of service nodes 10 and 30 represents a service instance.

Although illustrated as part of one of data centers 17, service nodes 10 and 30 may, for instance, be coupled by one or more switches or virtual switches of core network 7. In one example, each of service nodes 10 and 30 may run as virtual machines (VMs) or other virtual entities in a virtual computing environment. Moreover, the computing environment may comprise a scalable cluster of physical network devices, such as processor-based servers. As another example, service nodes 10 and 30 may comprise a combination of general purpose computing devices and special purpose appliances. Virtual service instances provided by service nodes 10 or 30 can scale vertically, just as in a modern data center, through the allocation of virtualized memory, processor utilization, storage and network policies, as well as horizontally by adding additional load balanced virtual machines.

Gateway 8A, for example, may steer individual subscriber packet flows 26 through defined sets of services provided by service nodes 10 of data center 17A. That is, each subscriber packet flow 26 may be forwarded through a particular ordered combination of services provided by service nodes 10 or 30, each ordered set being referred to herein as a "service chain," and each service chain providing a composite network service represented by the order and combination of individual network services (virtualized network functions) provided by the service nodes of the service chain.

In this way, subscriber flows 26 may be processed by service nodes 10 or 30 as the packets flow between access network 6 and public network 12 according to service chains configured by the service provider. In some examples, a particular service node may support multiple service chains. Once processed at a terminal node of the service chain, i.e., the last node 10 to apply services to packets flowing along a particular service path, the terminal node may direct the traffic back to a respective gateway 8 for the respective data center 17 such that the respective gateway 8 may direct the traffic to another service path within the respective data center 17 for further processing or to gateway 13 for forwarding to public network 12.

Service nodes 10 or 30 may implement one or more service chains using internally configured forwarding state that directs packets of the packet flow 26 along the service chains for processing according to the identified set of service nodes 10 or 30. Such forwarding state may specify tunnel interfaces for tunneling between service nodes 10 or 30 using network tunnels such as Internet Protocol (IP) or Generic Route Encapsulation (GRE) tunnels, or by using Virtual Local Area Networks (VLANs), Multiprotocol Label Switching (MPLS) techniques, and so forth. In some instances, real or virtual switches, routers or other network elements that interconnect service nodes 10 or 30 may be configured to direct packet flows to service nodes 10 or 30 according to service chains.

Service provider network 2 further includes Software-Defined Networking (SDN) cloud 24. SDN cloud 24 includes SDN controller 19, Domain Name System ("DNS") server 25, and switch 9 configured to direct traffic to the subcomponents of SDN cloud 24. In the example of FIG. 1, SDN controller 19 provides a logically and in some cases physically centralized controller for facilitating operation of one or more virtual networks within data centers 17. For example, SDN controller 19 provides a high-level controller for configuring and managing routing and switching infrastructure of service provider network 2 (e.g., gateways 8, core network 7 and service nodes 10 or 30). In some instances, SDN controller 19 manages deployment of virtual machines (VMs) or other virtual entities within the operating environment of data centers 17. For example, SDN controller 19 may establish one or more of service nodes 10 or 30 as a virtual service instance configured to apply a given service to packets. In this example, service provider network 2 may comprise a SDN/network functions virtualization (NFV) environment. In some examples, SDN controller 19 may operate in response to configuration input received from a network administrator. Additional information regarding SDN controller 19 operating in conjunction with other devices of data centers 10 or other software-defined networks is found in International Application Number PCT/US2013/044378, filed Jun. 5, 2013, and entitled PHYSICAL PATH DETERMINATION FOR VIRTUAL NETWORK PACKET FLOWS, which is incorporated by reference as if fully set forth herein.

In one example, SDN controller 19 interacts with gateway 8A of data center 17A to specify one or more service chains for data center 17A. For example, the service chain information provided by SDN controller 19 may specify any combination and ordering of services provided by service nodes 10, traffic engineering information (e.g., labels or next hops) for tunneling or otherwise transporting (e.g., MPLS or IP tunnels) packet flows along service paths, rate limits, Type of Service (TOS) markings or packet classifiers that specify criteria for matching packet flows to a particular service chain.

Based on the specification of the service chain information, SDN controller 19 may also establish unique tunnels for transporting packets of packet flows 26 between gateway 8 and service nodes 10 or 30 of a respective data center 17, and for transporting packet between service nodes 10 or 30 within data center 17. For example, SDN controller 19 may perform path computation and issue path setup messages and/or distribute labels or other header information to be used at each hop along each service path. Example details of an SDN controller capable of performing path computation and distributing labels to network elements are described in U.S. patent application Ser. No. 13/842,453, filed Mar. 15, 2013, the entire contents of which are incorporated herein by reference.

As discussed above, service nodes 10 or 30 may comprise virtual service instances deployed as VMs or other virtual entities hosted on one or more physical devices, e.g., servers, to offer individual services or chains of services. The use of virtual service instances enables automatic scaling of the services on-demand. In one example, SDN controller 19 may establish or instantiate additional virtual service instances within data center 17 for a given service based on an increased needed for the given service by packets of packet flows 26 received by gateway 8. In another example, SDN controller 19 may remove or tear down virtual service instances from each data center 17 for a given service based on a decreased needed for the given service by packets of packet flows 26 received by gateway 8.

DNS server 25 contains a database of addresses and hostnames for each device within a particular domain of service provider network 2. For example, DNS server 25 includes addresses and hostnames for each service node 10 or 30 of the plurality of databases 17, virtual services provided by each service node 10 or 30, gateways 8A-8N (collectively, "gateways 8"), and/or virtual machines executing within data centers 17 that are within the domain. A first device within service provider network 2, such as gateway 8A, may query DNS server 25 for a network address of a second device within service provider network 2, such as gateway 8N. In response to the query, DNS server 25 translates the query into a resolvable address and provides the address to the first device such that the first device may send network traffic to the second device. In some examples, DNS server 25 resolves the query into an IP address and hostname for the second device. In some examples, SDN cloud 24 includes a different DNS server 25 for each different domain within service provider network 2.

To achieve service chaining with high scale and throughput, gateway 8 may be used to anchor packets of packet flows 26 to the services offered by service nodes 10 or 30 of each respective data center 17 in both a forward and a reverse direction. In addition, each respective gateway 8 may be used to perform load balancing of packet flows 26 to first or front-end services in the service chains within a corresponding data center 17. In some scenarios, the virtual service instances or VMs per service of a particular data center 17 may be insufficient to support the service needs of packet flows 26. In this case, complete functionality for a given service may span across multiple VMs hosted on one or more physical servers across a plurality of data centers 17. Hence, a need for load balancing across the plurality of data centers 17 may arise at one of gateways 8, such as gateway 8A. For example, in situations where service nodes 10 of data center 17A are near or at capacity, gateway 8A may include service nodes 30 of data center 17N in a load balancing group and load balance packets assigned to that service across tunnels to service nodes 30 of data center 17N through gateway 8N.

Conventionally, a load balancing group for a given service is configured manually to include the service-providing entities, e.g., real or virtual service instances of services nodes 10 or 30, operating at a point in time. The load balancing group may be manually updated periodically to reflect changes in the service-providing entities. In the case of load balancing across a plurality of data centers 17, however, manual configuration of the load balancing group for the given service may be unable to accurately or efficiently track the on-demand scaling (i.e., instantiating and/or tearing down) of the virtual service instances for the given service at the scale provided by the plurality of data centers 17. Since the virtual service instances of the plurality of data centers 17 can be dynamically added, deleted, or migrated on physical network devices, and the services can go down and come up due to scheduled maintenance, it may be desirable for gateway 8A of data center 17A to be able to automatically discover virtual service instances established for a given service on a different data center, such as data center 17N. Additional techniques for automatically discovering virtual instances for load balancing within a single data center are described in U.S. patent application Ser. No. 15/199,069, filed Jun. 30, 2016, the entire contents of which is incorporated herein by reference.

In accordance with the techniques of this disclosure, GLB devices 20 perform automatic discovery, automatic scaling, and automatic load balancing of a plurality of virtual service instances provided by services nodes 10 and 30 of plurality of data centers 17. In the example of FIG. 1, gateways 8 of data centers 17 includes global load balancing (GLB) devices 20A-20N (collectively, GLB devices 20"). GLB devices 20 are configured to enable automatic discovery of a plurality of virtual service instances of a plurality of data centers 17 within service provider network 2. As described herein, a GLB device 20, such as GLB device 20A of data center 17A, may automatically discover virtual service instances for each other cloud data center 17 based on information received from SDN controller 19 and DNS server 25. Further, each GLB device 20 receives, from SDN controller 19, configuration information specifying a traffic load balancing algorithm for the virtual service instances. Each GLB device 20 updates a load balancing group for the network service to include the virtual service instances of the other discovered data centers 17 on which to load balance traffic for the network service. In this way, the disclosed techniques provide for automatic discovery, automatic scaling, and automatic load balancing of virtual service instances for a plurality of data centers 17 within service provider network.

In one example, SDN controller 19 and GLB device 20A establish a border gateway protocol (BGP) peer session 21 on which SDN controller 19 advertises address information for the virtual service instances of respective data center 10A that provide a particular network service. In one example, the BGP peer session implements an extended community of the BGP protocol. Additional information with respect to the implementation of BGP extended communities is described in "BGP Extended Communities Attribute," RFC 4360, Internet Engineering Task Force (IETF), February 2006, available at https://tools.ietf.org/rfc/rfc4360, the entire contents of which is incorporated herein by reference. In the above example, after peering with SDN controller 19, GLB device 20A, receives, from SDN controller 19, a BGP message that includes a BGP extended community subtype specifying one or more IP addresses for virtual service instances of data center 10A that implement the network service. In some examples, the BGP extended community subtype includes one or more BGP routes representing unique tunnels established by SDN controller 19, each tunnel of which extends from gateway 8A to a respective one of the virtual service instances of service nodes 10 of data center 17A for the network service. In this fashion, SDN controller 19 may install one or more routes to the virtual service instances within a routing table of gateway device 8A. Further, GLB device 20A, receives, from SDN controller 19, address information for DNS server 25. In one example, GLB device 20A receives a BGP message that includes a BGP extended community subtype specifying an IP address of DNS server 25.

Further, GLB device 20A receives, from SDN controller 19, a hostname of a domain for which to perform load balancing across the plurality of data centers 17 for the network service. With respect to the foregoing example, GLB device 20A receives a BGP message that includes a BGP capability message that includes a BGP capability code specifying a Fully Qualified Domain Name (FQDN) for a domain for which to perform load balancing across the plurality of data centers 17 for the network service. Additional information with respect to the implementation of BGP capabilities advertisement is described in "Capabilities Advertisement with BGP-4," RFC 5492, Internet Engineering Task Force (IETF), February 2009, available at https://tools.ietf.org/html/rfc5492, the entire contents of which is incorporated herein by reference. Thus, gateway 8A may automatically discover the virtual service endpoints of the advertised BGP routes as real services, and automatically update a load balancing group for the given domain to include the BGP routes within data center 17A.

Using the FQDN, GLB device 20A establishes a communication session 22 with DNS server 25 to query DNS server 25 for address information for other sets of virtual service instances that provide the network service but are provided by other data centers 17 within the domain, such as virtual service instances executing on service nodes 30 of data center 17N. DNS server 25 resolves the query and provides address information for the other sets of virtual service instances provided by the other data centers 17 within the domain. In some examples, DNS server 25 provides IPv4 addresses for the other sets of virtual service instances. In other examples, DNS server 25 provides IPv6 addresses for the other sets of virtual service instances. In yet further examples, GLB device 20A specifies an IP protocol, and DNS server 25 provides addresses for the other sets of virtual service instances in the IP protocol specified by GLB device 20A. In some examples, the other sets of virtual service instances provided by the other data centers 17 are located in a different geographic region from GLB device 20A or data center 17A.

Gateway 8A installs the address information for the other sets of virtual service instances. In this fashion, gateway 8A may learn address information (e.g., BGP routes) for sets of virtual service instances that provide the network service but are provided by data centers 17 within the domain other than data center 17A to which gateway 8A belongs. In some examples, GLB device 20A treats addresses learned from SDN controller 19 for virtual service instances executing on service nodes 10 within respective data center 17A as local IP addresses. In further examples, GLB device 20A treats addresses learned from DNS server 25 for virtual service instances executing on service nodes 10 or 30 within other data centers 17, such as virtual service instances executing on service nodes 30 within data center 17N, as virtual IP addresses.

SDN controller 19 further provides GLB device 20 with information for automatically provisioning, for the network service, one or more virtual service instances of the plurality of data centers 17. For example, GLB device 20A receives a BGP message that includes a BGP extended community subtype specifying a load balancing algorithm for the network service. As one example, the BGP extended community subtype specifies the load balancing algorithm, such as one of a round-robin method, a least connections method, a random method, a static proximity method, or a dynamic proximity method. In another example, the BGP extended community subtype further specifies a maximum number of connections for the network service. In another example, the BGP extended community subtype further specifies whether or not the network service is operating in a maintenance mode.

GLB device 20 may apply the load balancing algorithm to network traffic for the network service. For example, based on the load balancing algorithm, gateway 8A may route traffic for the network service to virtual service instances executing on service nodes 10 of data center 17A, or route the traffic for the network service to virtual service instances executing on service nodes 10 or 30 of another data center 17 within the domain, such as service nodes 30 of data center 17N. In some examples, GLB device 20A polls traffic flow statistics for virtual service instances within other data centers 17 so as to apply the load balancing algorithm to the traffic for the network service across data centers 17. In one example, upon receipt of packets of packet flows 26 assigned to the given network service, a load balancer of gateway 8A selects one of the BGP routes from the load balancing group for the given service. As described above, the BGP routes may include routes to virtual service instances executing on service nodes 10 of data center 17A, or routes for virtual service instances executing on service nodes 10 or 30 of another data center 17 within the domain, such as service nodes 30 of data center 17N. In some examples, gateway 8A may modify the packets of packet flows 26 as gateway 8A steers the packets into the appropriate service or service chain. For example, gateway 8A may prepend to each packet a header and/or label (e.g., an additional IP header and/or MPLS label) to form a "tunnel packet" in which the packet is encapsulated as a payload. Gateway 8A may select the particular header based on the particular subscriber and the service chain to which the particular type of packet flow for the particular subscriber is assigned. In further examples, gateway 8A selects the particular header and/or label based on the one of the BGP routes selected from the load balancing group for the front-end service of a service chain implementing the network service. Gateway 8A then forwards the encapsulated packets based on the header and/or label for the selected BGP route to the virtual service endpoint for application of the given service to the packets.

Thus, by using the techniques of the disclosure, GLB devices 20 may automatically discover virtual service instances provided by a plurality of service nodes 10, 30 across a plurality of data centers 17. Additionally, GLB devices 20 may perform automatic load balancing of the virtual services instances across the plurality of cloud data centers 17 providing the virtual service instances so as to load balance customer traffic for the virtual services across a plurality of service nodes 10, 30 across the plurality of cloud data centers 17. Furthermore, GLB devices 20 may enable automatic scaling of the virtual service instances across the plurality of cloud data centers 17 so as to instantiate or remove virtual service instances across the plurality of cloud data centers 17 on a dynamic basis to support customer demand for the virtual services.

In some example implementations, the functionality and operations described herein in reference to SDN controller 19 may be implemented by a combination of devices or components. For example, in one example implementation, the functionality and operations described herein in reference to SDN controller 19 may be implemented by an orchestration engine operating in concert with an SDN controller that manages underlying network state for routing and switching components so as to provide the requested network and network services. As such, SDN controller 19 of FIG. 1 may represent an orchestration engine that manages networking services and an underlying SDN controller that implements high-level requests from the orchestration engine by configuring physical switches, e.g. TOR switches, chassis switches, or switch fabric of the service provider core; physical routers; physical service nodes such as firewalls and load balancers and the like. Although not shown in FIG. 1, any reference to the term SDN controller herein is understood to encompass implementations in which an orchestration engine is used as part of or in conjunction with the SDN controller. Further example details of an orchestration engine are described in ETSI GS NFV-MAN 001, Network Functions Virtualization (NFV) Management and Orchestration, dated December 2014, the entire contents of which are incorporated herein by reference.

Figure 2:
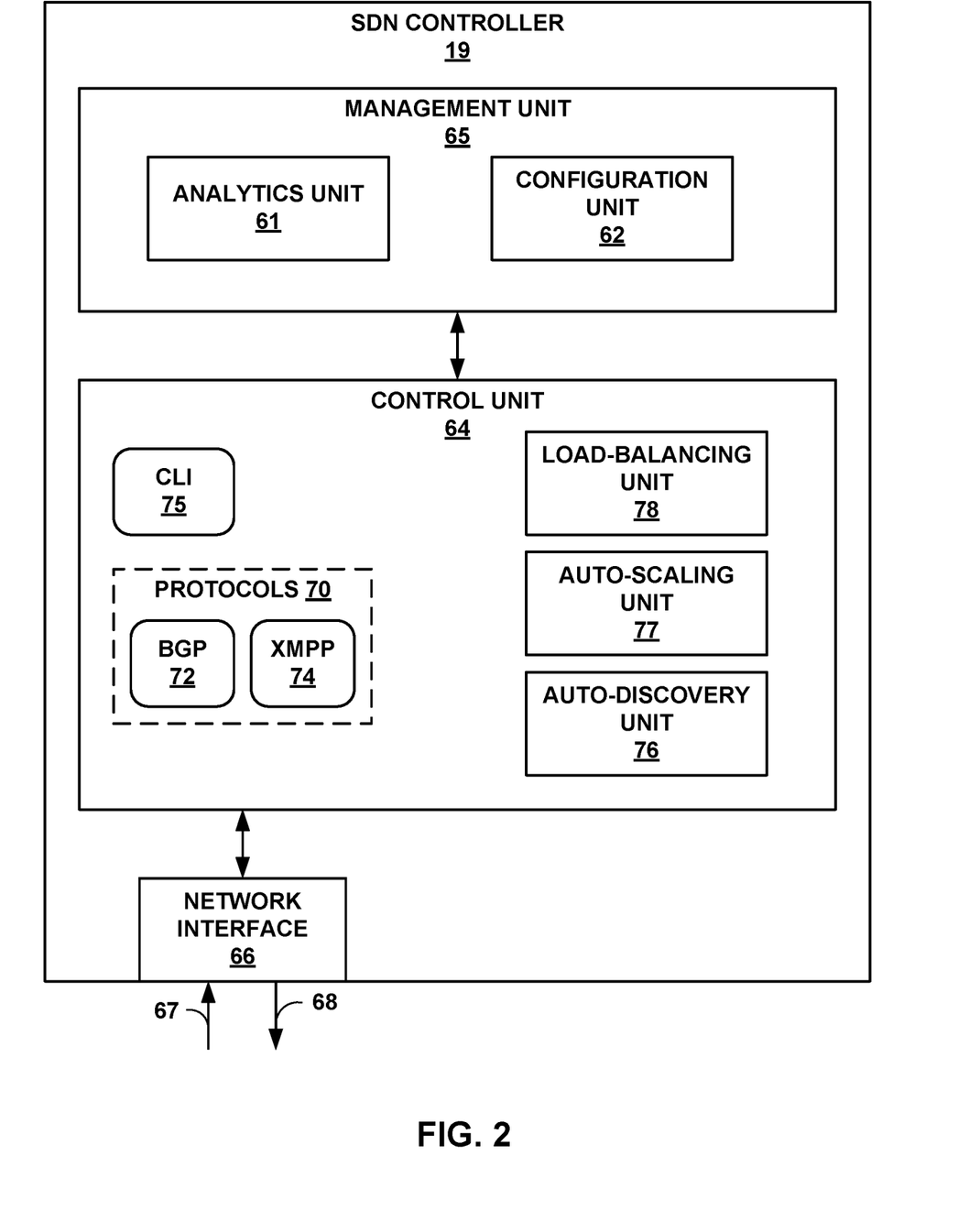
FIG. 2 is a block diagram illustrating the example SDN controller of FIG. 1 configured to implement the techniques described herein.

FIG. 2 is a block diagram illustrating the example SDN controller 19 of FIG. 1 configured to implement the techniques described herein. In the example of FIG. 2, SDN controller 24 enables GLB devices 20 of FIG. 1 to perform automatic discovery, automatic scaling, and automatic load balancing of a plurality of virtual service instances provided by services nodes 10 and 30 of plurality of data centers 17 of FIG. 1. SDN controller 19 may operate as a network services controller for a service provider network. In the illustrated example of FIG. 2, SDN controller 19 includes a management unit 65, a control unit 64 for controlling operation of SDN controller 19, and a network interface 66 for exchanging packets with network devices by inbound link 67 and outbound link 68.

In some examples, control unit 64 and/or management unit 65 may be implemented as one or more processes executing on one or more virtual machines of one or more physical computing devices. That is, while generally illustrated and described as executing on a single SDN controller 19, aspects of each of these units may be delegated to or distributed across other computing devices.

Each of control unit 64 and/or management unit 65 may include one or more processors (not shown) that execute software instructions, such as those used to define a software or computer program, stored to a computer-readable storage medium (not shown), such as non-transitory computer-readable mediums including a storage device (e.g., a disk drive, or an optical drive) or a memory (such as Flash memory or RAM) or any other type of volatile or non-volatile memory, that stores instructions to cause the one or more processors to perform the techniques described herein. Alternatively, or additionally, each of control unit 64 and/or management unit 65 may comprise dedicated hardware, such as one or more integrated circuits, one or more application-specific integrated circuits (ASICs), one or more Application Specific Special Processors (ASSPs), one or more FPGAs, or any combination of one or more of the foregoing examples of dedicated hardware, for performing the techniques described herein. The architecture of SDN controller 19 illustrated in FIG. 2 is shown for example purposes only and should not be limited to this architecture. In other examples, SDN controller 19 may be implemented in a variety of ways, such software only, hardware only, or a combination of both software and hardware.

Management unit 65 may comprise a management layer of SDN controller 19, whereas control unit 64 may comprise a control layer of SDN controller 19. Management unit 65 includes an analytics unit 61 and a configuration unit 62. Analytics unit 61 may capture information from physical and/or virtual network elements within service provider network 2, e.g., gateway 8 and service nodes 10 or 30 of each data center 17 of FIG. 1, and analyze the information for use in managing the network services offered by the service provider. The information may include statistics, logs, events, and errors.

Configuration unit 62 stores configuration information for the network elements within service provider network 2. In some examples, the configuration information comprises a virtual network configuration. Configuration unit 62 may translate a high-level data model of the intended virtual network configuration to a lower-level data model for use in interacting with the network elements.

Control unit 64 of SDN controller 19 implements a centralized control plane for service provider network 2 that is responsible for maintaining a constantly changing network state. Control unit 64 interacts with the network elements within service provider network 2 to maintain a consistent network state across all of the network elements. Control unit 64 provides an operating environment for a command line interface daemon 75 ("CLI 75") that provides an interface by which an administrator or other management entity may modify the configuration of SDN controller 19 using text-based commands. Control unit 64 also provides an operating environment for several protocols 70, including Border Gateway Protocol (BGP) 72 and Extensible Messaging and Presence Protocol (XMPP) 74 as illustrated in the example of FIG. 2.

In some examples, control unit 64 uses XMPP 74 to communicate with network elements within service provider network 2, such as gateways 8, GLB devices 20, or service nodes 10 or 30 of data centers 17 within service provider network 2 of FIG. 1, by an XMPP interface (not shown). Virtual network route data, statistics collection, logs, and configuration information may be sent as extensible markup language (XML) documents in accordance with XMPP 74 for communication between SDN controller 19 and the network elements. Control unit 64 may also use XMPP 74 to communicate with one or both of analytics unit 61 and configuration unit 62 of SDN controller 19. Control unit 64 executes BGP 72 to establish BGP peer sessions with BGP speakers and BGP listeners within service provider network 2 to exchange routing information. For example, control unit 64 may use BGP 72 to establish a BGP peer session with a GLB device 20, e.g., with GLB device 20A from FIG. 1.

In accordance with the techniques of the disclosure, control unit 64 further includes auto-discovery unit 76, auto-scaling unit 77, and load balancing unit 78 which enables control unit 64 to assist GLB devices 20 of FIG. 1 to automatically discover, automatically scale, and automatically load balance virtual service instances provided by a plurality of service nodes 10, 30 across the plurality of data centers 17 of FIG. 1. Auto-scaling unit 77 is configured to communicate with physical network devices, e.g., servers, using XMPP 74 to establish or remove virtual network service instances of plurality of data centers 17 in response to fluctuating demands for different services for packet flows in service provider network 2. For example, auto-scaling unit 74 may establish a set of two or more virtual service instances of a given service as two or more virtual machines (VMs) or other virtual entities running on at least one physical network device, such as a server, within one or more data centers 17. Auto-scaling unit 77 may also be configured to use BGP 72 to establish unique tunnels that each extends from a gateway network device in service provider network 2, such as gateway 8A, to a respective one of the set of instantiated virtual service instances of the given service provided by one or more service nodes 10 or 30 of the plurality of data centers 17. Each of the unique tunnels may have a tunnel identifier that includes a tunnel address of a GRE tunnel that extends from, e.g., gateway 8A to one of service nodes 10 or 30 of the plurality of data centers 17, and a label assigned to one of the virtual service instances of the given service running on the one of service nodes 10 or 30 of the plurality of data centers 17.

Auto-discovery unit 76 is configured to calculate BGP routes that represent the unique tunnels between gateway devices 8 and virtual service instances provided by the plurality of data centers 17 within the domain of the given service. Auto-discovery unit 76 is further configured to advertise the BGP routes for the virtual service instances to GLB devices 20 of gateway devices 8 via a BGP peer session with a respective GLB device 20. For example, auto-discovery unit 76 may establish a BGP peer session 21 with GLB device 20A. In one example, the BGP peer session implements an extended community of the BGP protocol. In one example, auto-discovery unit 76 transmits to GLB device 20A a BGP message that includes a BGP extended community subtype specifying one or more IP addresses for virtual service instances of data center 10A that implement the network service. In some examples, the BGP extended community subtype includes one or more of the BGP routes established by auto-discovery unit 76. Further, auto-discovery unit 76 transmits, to GLB device 20A, a BGP message that includes an extended community specifying an IP address of DNS server 25. In this fashion, auto-discovery unit 76 may enable GLB device 20A to query DNS server 25 to automatically discover virtual service instances of other data centers 10.

Load balancing unit 78 is configured to provide load balancing functions for the network service across the plurality of data centers 10. For example, load balancing unit 78 transmits, to GLB device 20A of gateway device 8A, a hostname of a domain for which to perform load balancing across the plurality of data centers 17 for the network service. In one example, load balancing unit 78 transmits, to GLB device 20A of gateway device 8A, a BGP capabilities message that includes a BGP capability code specifying an FQDN for a domain for which to perform load balancing across the plurality of data centers 17 for the network service. Thus, load balancing unit 78 may allow GLB device 20A to use the FQDN to query DNS server 25 for address information for other sets of virtual service instances that provide the network service but are provided by other data centers 17 within the domain, such as virtual service instances executing on service nodes 30 of data center 17N.

Load balancing unit 78 further provides GLB devices 20 with information for automatically load balancing, for the network service, one or more virtual service instances of the plurality of data centers 17. For example, load balancing unit 78 transmits, to GLB device 20A, a BGP message that includes a BGP extended community subtype specifying a load balancing algorithm for the network service. As one example, the BGP extended community subtype specifies a load balancing method, such as one of a round-robin method, a least connections method, a random method, a static proximity method, or a dynamic proximity method. In another example, the BGP extended community subtype further specifies a maximum number of connections for the network service. In another example, the BGP extended community subtype further specifies whether or not the network service is operating in a maintenance mode.

Figure 3:
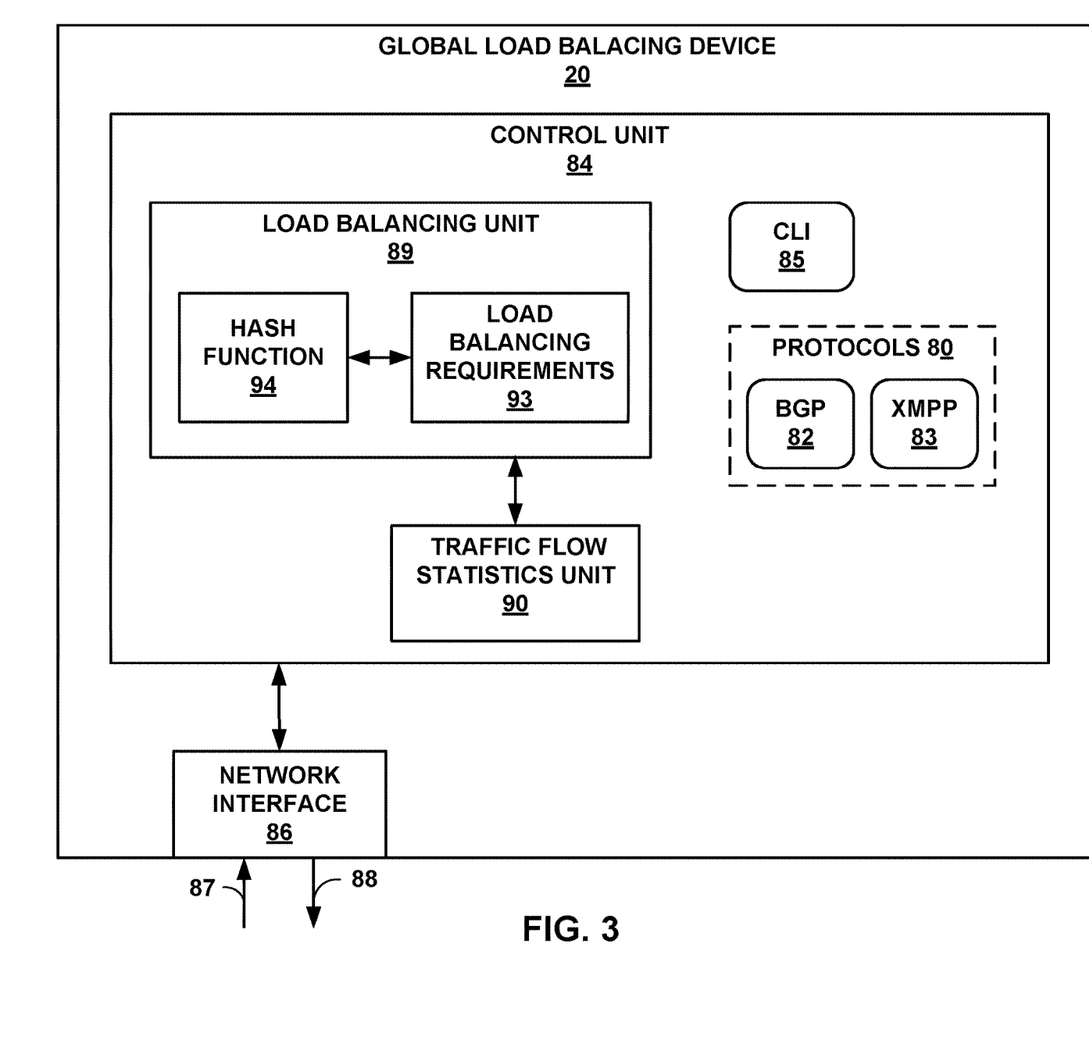
FIG. 3 is a block diagram illustrating an example global load balancing device configured to implement the techniques described herein.

FIG. 3 is a block diagram illustrating an example GLB device 20 configured to implement the techniques described herein. GLB device 20 includes a control unit 84 coupled to network interface 86 to exchange packets with network devices by inbound link 87 and outbound link 88. In general, GLB device 20, based on information received from SDN controller 19 of FIG. 1, may perform automatic discovery, automatic scaling, and automatic load balancing of virtual service instances provided by a plurality of service nodes 10, 30 across the plurality of data centers 17 of FIG. 1. Control unit 84 of GLB device 20 provides an operating environment for a command line interface daemon 85 ("CLI 85") that provides an interface by which an administrator or other management entity may modify the configuration of GLB device 20 using text-based commands. Control unit 84 also provides an operating environment for several protocols 80, including BGP 82 and XMPP 83 as illustrated in the example of FIG. 2.

In some examples, control unit 84 uses XMPP 83 to communicate with a corresponding gateway 8 or SDN controller 19, by an XMPP interface (not shown). Virtual network route data, statistics collection, logs, and configuration information may be sent as extensible markup language (XML) documents in accordance with XMPP 83 for communication between GLB device 20 and other devices. Control unit 84 executes BGP 82 to establish BGP peer sessions with BGP speakers and BGP listeners within service provider network 2 to exchange routing information. For example, control unit 84 may use BGP 82 to establish a BGP peer session with SDN controller 19 of FIG. 1.

In accordance with the techniques of the disclosure, control unit 84 includes load balancing unit 89 which load balances packet flows for the network service across one or more virtual service instances of server nodes 10 or 30 of the plurality of data centers 17. In one example, load balancing unit 89 establishes a BGP peer session with SDN controller 19 and receives, from SDN controller 19, a hostname of a domain for which to perform load balancing across the plurality of data centers 17 for the network service. In one example, load balancing unit 78 transmits, to SDN controller 19 via network interface 86, a BGP message that includes a BGP extended community subtype specifying an FQDN for a domain for which to perform load balancing across the plurality of data centers 17 for the network service. Using the FQDN, load balancing unit 78 queries DNS server 25 to resolve address information for other sets of virtual service instances that provide the network service but are provided by other data centers 17 within the domain.

Load balancing unit 89 further receives, from SDN controller 19, information for automatically provisioning and load balancing, for the network service, the one or more virtual service instances of the plurality of data centers 17 and stores this information as load balancing requirements 93. For example, load balancing unit 89 receives, from SDN controller 19, a BGP message that includes a BGP extended community subtype specifying a traffic load balancing algorithm for the network service. As one example, the BGP extended community subtype specifies a load balancing method, such as one of a round-robin method, a least connections method, a random method, a static proximity method, or a dynamic proximity method. In another example, the BGP extended community subtype further specifies a maximum number of connections for the network service. In another example, the BGP extended community subtype further specifies whether or not the network service is operating in a maintenance mode.

To perform load balancing, load balancing module 89 selects a virtual server instance of the one or more virtual service instances by applying hash function 94 to a packet of a new packet flow. For example, load balancing module 89 applies hash function 94 to a packet header of the packet, such as the 5-tuple {source IP address, destination IP address, source port number, destination port number, protocol}. For existing packet flows, load balancing module 89 may, in some cases, apply the same hash function 94 to all packets of the packet flow. Alternatively, or additionally, to ensure in-order delivery of packets of the packet flow corresponding to the received packet, load balancing module 89 may store an identification of the selected link for the packet flow upon receiving a new packet flow. For example, load balancing module 89 may inspect the packet header to determine whether the packet is a SYN packet. When the packet is a SYN packet, load balancing module 89 determines that the packet corresponds to a new packet flow. When the packet is not a SYN packet, load balancing module 89 forwards the packet to the selected virtual service instance according to the stored identification.

Control unit 84 may further include traffic flow statistics unit 90, which tracks the amount of traffic associated with each of the hash values. Load balancing unit 89 also maintains load balancing requirements 93 based on the information received from SDN controller 19, network administrator configuration, and/or load balancing information received from routing protocol messages. Traffic flow statistics unit 90 may track traffic flows using a counter for each of the possible hash values. The counter may track the number of packets received for each hash value, the number of bytes received for each hash value or the like. Traffic flow statistics unit 90 may further track the amount of traffic corresponding to each of the possible next hops. In this manner, traffic flow statistics unit 90 may track the amount traffic flow of each virtual service instance of service nodes 10 or 30 of the plurality of data centers 17. Load balancing unit 89 compares the measured traffic flow statistics to load balancing requirements 93 and may re-distribute the traffic across one or more virtual service instances in accordance with load balancing requirements 93. Traffic flow statistics unit 90 may maintain traffic flow the traffic flow statistics in the form of a variety of data structures, such as a number of tables, link lists, radix trees, databases, flat files, or other data structures. Furthermore, traffic flow statistics unit 90 may store the data structures on one or more computer-readable media, such as a magnetic medium, optical medium, non-volatile random access memory (NVRAM), dynamic random access memory (DRAM), FLASH memory, or the like.

Thus, based on information exchanged with SDN controller 19, GLB device 20 may automatically discover virtual service instances provided by a plurality of service nodes 10, 30 across a plurality of data centers 17 of FIG. 1. Additionally, GLB device 20 may enable each corresponding gateway 8 to perform automatic load balancing and scaling of the virtual services instances across the plurality of cloud data centers 17.

Figure 4:
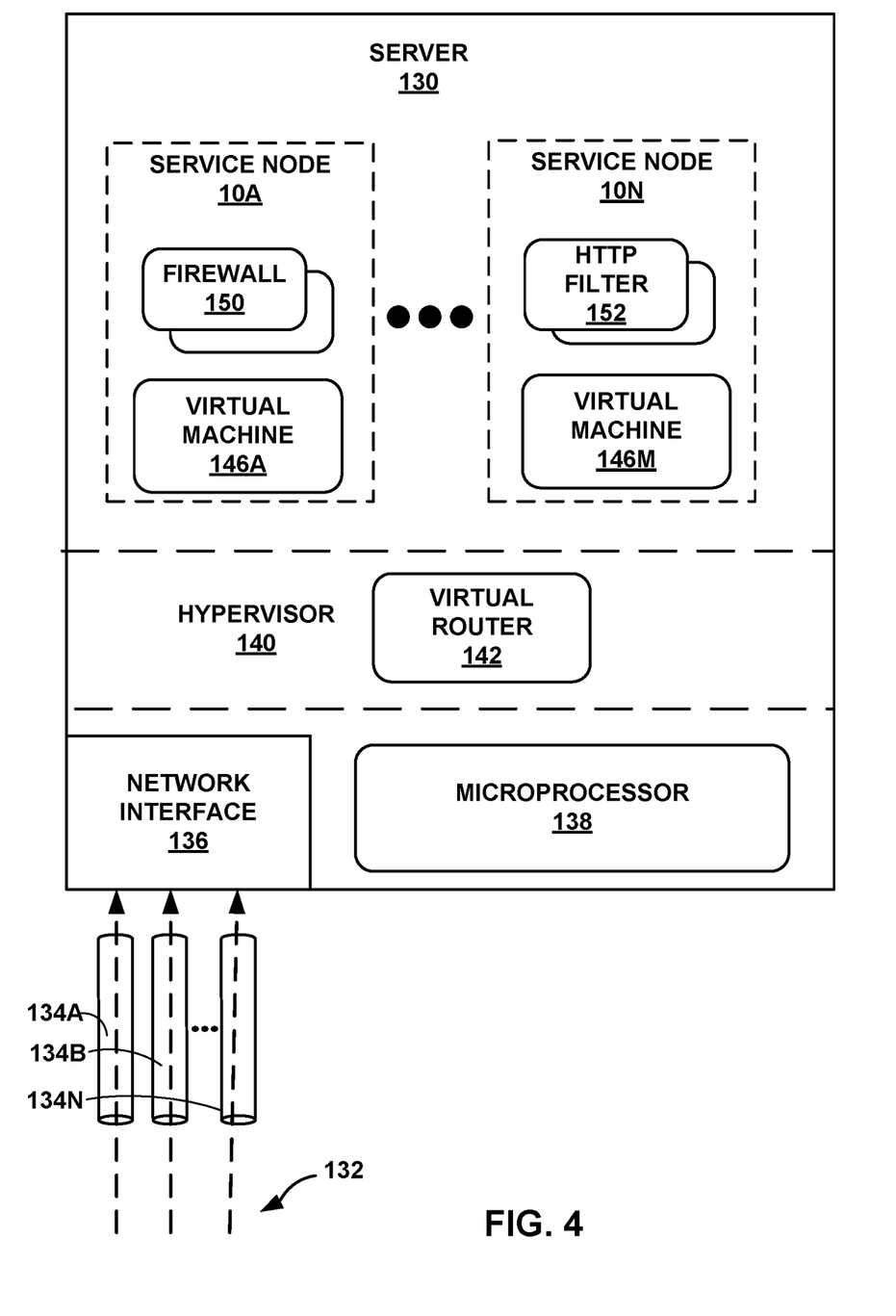
FIG. 4 is a block diagram illustrating an example server that provides an operating environment for one or more service nodes.

FIG. 4 is a block diagram illustrating an example server 130 that provides an operating environment for one or more service nodes 10A-10N (collectively "service nodes 10"). In some examples, server 130 may comprise a server within a data center, such as data center 17A of FIG. 1. Service nodes 10 of FIG. 4 may be substantially similar to service nodes 10 of data center 17A of FIG. 1 or may be substantially similar to service nodes 30 of data center 17N of FIG. 1.

In this example, server 130 includes a network interface 136 to receive tunnel packets 132 over a plurality of unique tunnels 134A-134N (collectively "tunnels 134"). Each of the unique tunnels 134 corresponds to a different one of a plurality of services, which may be front-end services in different service chains that comprise different ordered sets of one or more stateful network services to be applied to packet flows. Each of the tunnel packets 132 encapsulates a subscriber packet and includes a tunnel identifier for one of the unique tunnels 134 that extends to one of the virtual service instances, e.g., service nodes 10, configured on servicer 130 to apply a given service to the tunnel packets 132. As described above, the tunnel identifier for one of the unique tunnels 134, e.g., unique tunnel 134A, that extends to one of the virtual service instances, e.g., service node 10A, includes a tunnel address of a GRE tunnel to reach server 130 with a label assigned to service node 10A.

In the example of FIG. 4, server 130 includes a microprocessor 138 executing hypervisor 140 to provide an execution environment for a virtual router 142 and one or more virtual machines 146A-146M (collectively "virtual machines 146") within service nodes 10. Virtual machines 146 of service nodes 10 provide virtual service endpoints for unique tunnels 134. Each of the virtual machines 146 executes network services software, such as firewall instance 150 within service node 10A and HTTP filter instance 152 within service node 10N, to apply one or more of the network services to the packet flows.

Upon receipt of tunnel packets 132 via one of unique tunnels 134, e.g., unique tunnel 134A, virtual router 142 processes and removes the tunnel identifiers of each of the tunnel packets to determine which of service nodes 10 to send the respective packet. For example, for a specific tunnel packet, virtual router 142 first removes the GRE tunnel address used to reach server 130 from the tunnel packet, and then reads and removes the label assigned to the service instance endpoint of unique tunnel 134A. Based on the label, virtual router 142 forwards the decapsulated packet onto the appropriate tap interface of one of service nodes 10, e.g., service node 10A. In this example, virtual machine 146A of service node 10A receives the decapsulated packet and applies the service of firewall instance 150 to the decapsulated packet.

Figure 5:
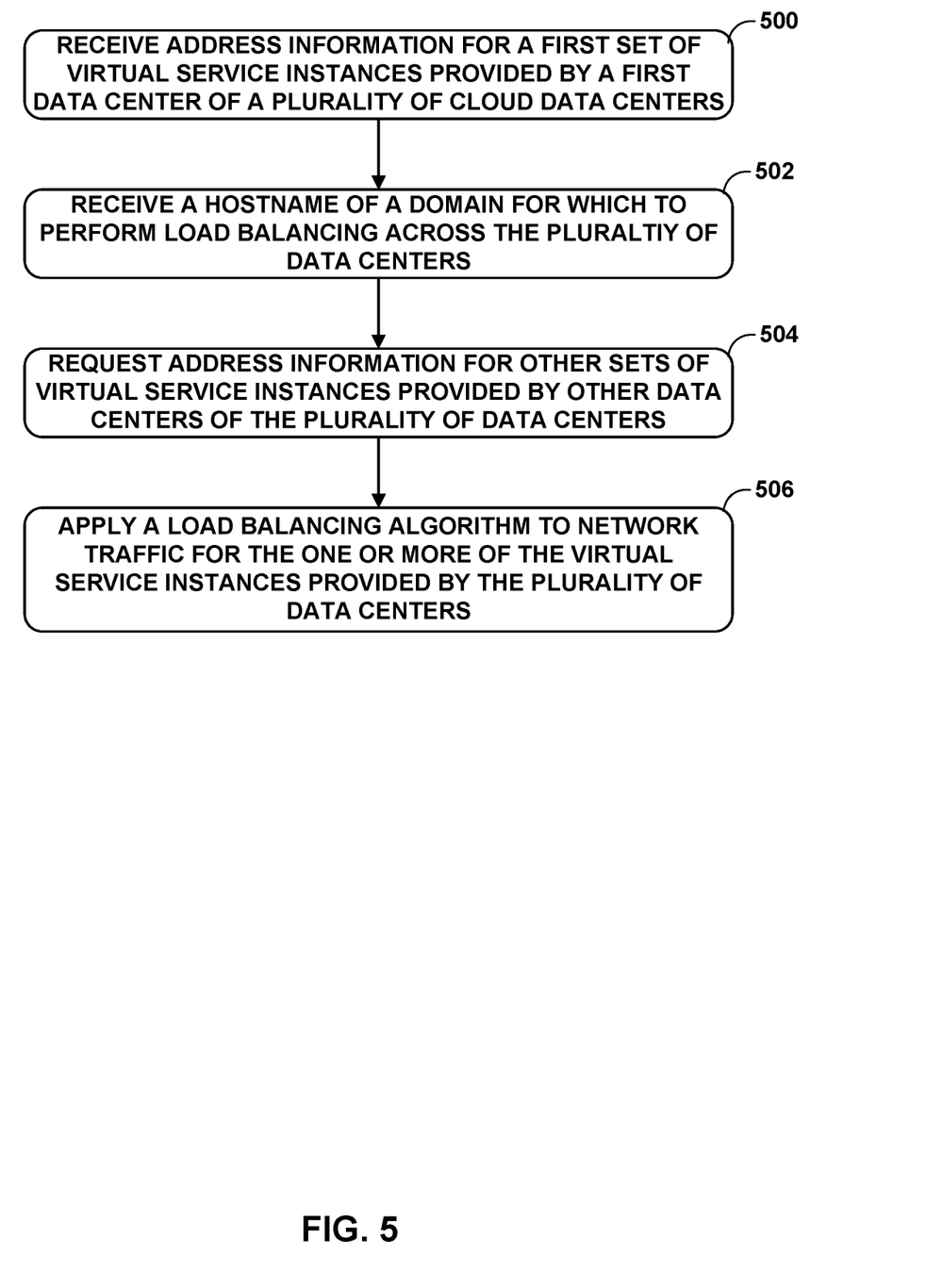
FIG. 5 is a flowchart illustrating an example operation in accordance with the techniques of the disclosure.

FIG. 5 is a flowchart illustrating an example operation in accordance with the techniques of the disclosure. For convenience, FIG. 5 is described with respect to FIG. 1. In general, GLB device 20, based on information received from SDN controller 19, performs automatic discovery, automatic scaling, and automatic load balancing of virtual service instances provided by a plurality of service nodes 10, 30 across the plurality of data centers 17.

In one example, GLB device 20A receives, from SDN controller 19, address information for a first set of virtual service instances provided by service nodes 10 of a first cloud data center (e.g., data center 17A) of the plurality of cloud data centers 17 (500). In one example, SDN controller 19 and GLB device 20A establish a BGP peer session 21 on which SDN controller 19 advertises the address information for the virtual service instances of data center 10A that provide a particular network service. After peering with SDN controller 19, GLB device 20A, receives, from SDN controller 19, a BGP message that includes a BGP extended community subtype specifying one or more IP addresses for virtual service instances of data center 10A that implement the network service. Further, GLB device 20A, receives, from SDN controller 19, address information for DNS server 25. In one example, GLB device 20A receives a BGP message that includes a BGP extended community specifying an IP address of DNS server 25.

Further, GLB device 20A receives, from SDN controller 19, a hostname of a domain for which to perform load balancing across the plurality of cloud data centers 17 (502). In one example, GLB device 20A receives, from SDN controller 19, a BGP capabilities message that includes a BGP capability code specifying an FQDN for a domain for which to perform load balancing across the plurality of data centers 17 for the network service.

GLB device 20A requests, from DNS server 25, address information for other sets of virtual service instances provided by service nodes 10 or 30 of other cloud data centers (e.g., service nodes 30 of data center 17N) of the plurality of cloud data centers (504). For example, GLB device uses the FQDN received from SDN controller 19 to request address information for virtual service instances within the domain that provide the network service but are provided by service nodes 10 or 30 located within other data centers 17. In some examples, the other sets of virtual service instances provided by the other data centers 17 are located in a different geographic region from GLB device 20A or data center 17A. In some examples, DNS server 25 provides to GLB device 20A IPv4 addresses for the other sets of virtual service instances. In other examples, DNS server 25 provides IPv6 addresses for the other sets of virtual service instances. GLB device 20A installs, in a RIB of gateway 8A, the address information for the other sets of virtual service instances. In this fashion, gateway 8A may learn address information (e.g., BGP routes) for sets of virtual service instances that provide the network service but are provided by data centers 17 within the domain other than data center 17A to which gateway 8A belongs.

Furthermore, GLB device 20A applies a load balancing algorithm to network traffic for the one or more of the virtual service instances provided by the plurality of cloud data centers 17 (506). In one example, GLB device 20A receives, from SDN controller 19, a BGP message that includes a BGP extended community subtype specifying traffic load balancing algorithm for the network service. As one example, the BGP extended community subtype specifies a load balancing method, such as one of a round-robin method, a least connections method, a random method, a static proximity method, or a dynamic proximity method. In another example, the BGP extended community subtype further specifies a maximum number of connections for the network service. In another example, the BGP extended community subtype further specifies whether or not the network service is operating in a maintenance mode. GLB device 20A applies the load balancing algorithm to network traffic for the network service. For example, based on the load balancing algorithm, gateway 8A may route traffic for the network service to virtual service instances executing on service nodes 10 of data center 17A, or route the traffic for the network service to virtual service instances executing on service nodes 10 or 30 of another data center 17 within the domain, such as service nodes 30 of data center 17N. In this fashion, the disclosed techniques permit GLB device 20A may perform automatic discovery, automatic scaling, and automatic load balancing of virtual service instances for a plurality of cloud data centers 17 across service provider network 2.

Figure 6:
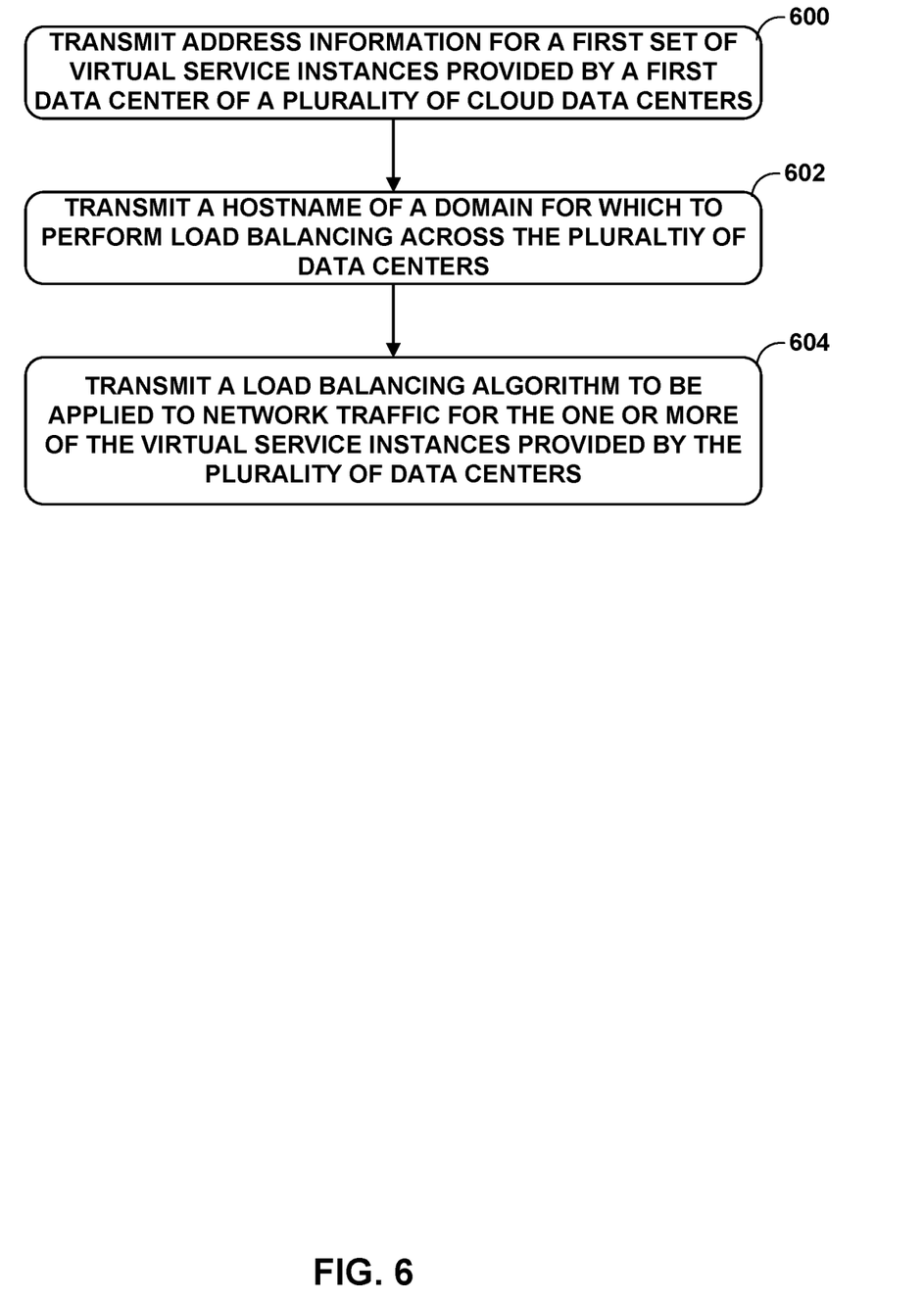
FIG. 6 is a flowchart illustrating an example operation in accordance with the techniques of the disclosure.

FIG. 6 is a flowchart illustrating an example operation in accordance with the techniques of the disclosure. For convenience, FIG. 6 is described with respect to FIG. 1. In general, SDN controller 19 provides information to GLB device 20 to enable GLB device 20 to perform automatic discovery, automatic scaling, and automatic load balancing of virtual service instances provided by a plurality of service nodes 10, 30 across the plurality of data centers 17.

In one example, SDN controller transmits, to GLB device 20A address information for a first set of virtual service instances provided by service nodes 10 of a first cloud data center (e.g., data center 17A) of the plurality of cloud data centers 17 (600). In one example, SDN controller 19 and GLB device 20A establish a BGP peer session 21 on which SDN controller 19 advertises the address information for the virtual service instances of data center 10A that provide a particular network service. After peering with GLB device 20A, SDN controller 19 transmits, to GLB device 20A, a BGP message that includes a BGP extended community subtype specifying one or more IP addresses for virtual service instances of data center 10A that implement the network service. Further, SDN controller 19 transmits, to GLB device 20A, address information for DNS server 25. In one example, SDN controller 19 transmits a BGP message that includes a BGP extended community specifying an IP address of DNS server 25.

Further, SDN controller 19 transmits, to GLB device 20A, a hostname of a domain for which to perform load balancing across the plurality of cloud data centers 17 (602). In one example, SDN controller 19 transmits, to GLB device 20A, a BGP capabilities message that includes a BGP capability code specifying an FQDN for a domain for which to perform load balancing across the plurality of data centers 17 for the network service.

Furthermore, SDN controller 19 transmits, to GLB device 20A, a load balancing algorithm to be applied to network traffic for the one or more of the virtual service instances provided by the plurality of cloud data centers 17 (604). In one example, SDN controller 19 transmits, to GLB device 20A, a BGP message that includes a BGP extended community subtype specifying a traffic load balancing algorithm for the network service. As one example, the BGP extended community subtype specifies a load balancing method, such as one of a round-robin method, a least connections method, a random method, a static proximity method, or a dynamic proximity method. In another example, the BGP extended community subtype further specifies a maximum number of connections for the network service. In another example, the BGP extended community subtype further specifies whether or not the network service is operating in a maintenance mode. In this fashion, SDN controller 19 may cause GLB device 20A to apply the specified load balancing algorithm to network traffic for the network service. For example, based on the load balancing algorithm, gateway 8A may route traffic for the network service to virtual service instances executing on service nodes 10 of data center 17A, or route the traffic for the network service to virtual service instances executing on service nodes 10 or 30 of another data center 17 within the domain, such as service nodes 30 of data center 17N. In this fashion, the disclosed techniques permit SDN controller 19 to facilitate automatic discovery, automatic scaling, and automatic load balancing by GLB devices 20 of virtual service instances for a plurality of cloud data centers 17 across service provider network 2.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A method comprising:
receiving, by a global load balancing (GLB) device of a first cloud data center of a plurality of cloud data centers that provide one or more virtual service instances, and from a software-defined networking (SDN) controller for a service provider network, address information for a first set of virtual service instances provided by the first cloud data center of the plurality of cloud data centers;
receiving, by the GLB device and from the SDN controller, a hostname of a domain for which to perform load balancing across the plurality of cloud data centers;
requesting, by the GLB device and from a domain name server (DNS) for the domain, address information for other sets of virtual service instances provided by other cloud data centers of the plurality of cloud data centers; and
applying, by the GLB device, a load balancing algorithm to network traffic for the one or more of the virtual service instances provided by the plurality of cloud data centers.

2. The method of claim 1, further comprising establishing, by the GLB device, a border gateway protocol (BGP) peer session with the SDN controller.

3. The method of claim 2, wherein receiving the address information for the first set of virtual service instances comprises receiving, by the GLB device and from the SDN controller, a BGP extended community message comprising a subtype specifying local address information for the first set of virtual service instances provided by the first cloud data center of the plurality of cloud data centers.

4. The method of claim 2, further comprising receiving, by the GLB device and from the SDN controller, a BGP extended community message comprising a subtype specifying address information for the DNS server for the domain.

5. The method of claim 2, wherein receiving the hostname of the domain comprises receiving, by the GLB device and from the SDN controller, a BGP capability message comprising a capabilities code specifying the hostname of the domain for which to perform load balancing across the plurality of cloud data centers.

6. The method of claim 2, wherein further comprising receiving, by the GLB device and from the SDN controller, a BGP extended community message comprising a subtype specifying the load balancing algorithm to be applied to network traffic for the one or more of the virtual service instances provided by the plurality of cloud data centers.

7. The method of claim 6, wherein the subtype specifying the load balancing algorithm comprises a first subtype, and wherein the BGP extended community message further comprises:
  a second subtype specifying a maximum number of connections for the one or more of the virtual service instances provided by the plurality of cloud data centers; and
  a third subtype specifying a maintenance mode for the one or more of the virtual service instances provided by the plurality of cloud data centers.

8. The method of claim 1, wherein the load balancing algorithm comprises one of:
  a round-robin method;
  a least connections method;
  a random method;
  a static proximity method; or
  a dynamic proximity method.

9. The method of claim 1, further comprising:
  directing, by the GLB device and based on the load balancing algorithm, first network traffic to the first set of virtual service instances provided by the first cloud data center; and
  directing, by the GLB device and based on the load balancing algorithm, second network traffic to a second set of virtual service instances provided by a second cloud data center of the plurality of cloud data centers that is different from the first cloud data center.

10. The method of claim 1, wherein each cloud data center of the plurality of cloud data centers comprises a respective GLB device.

11. The method of claim 1, wherein each cloud data center of the plurality of cloud data centers is in a geographic location that is different from a geographic location of each other cloud data center of the plurality of cloud data centers.

12. A method comprising:
  transmitting, by a software-defined networking (SDN) controller for a service provider network and to a global load balancing (GLB) device of a first cloud data center of a plurality of cloud data centers that provide one or more virtual service instances, address information for a first set of virtual service instances provided by the first cloud data center of the plurality of cloud data centers;
  transmitting, by the SDN controller and to the GLB device, a hostname of a domain for which to perform load balancing across the plurality of cloud data centers; and
  transmitting, by the SDN controller and to the GLB device, a load balancing algorithm to be applied to network traffic for the one or more of the virtual service instances provided by the plurality of cloud data centers.

13. The method of claim 12, further comprising establishing, by the SDN controller, a border gateway protocol (BGP) peer session with the GLB device.

14. The method of claim 13, wherein transmitting the address information for the first set of virtual service instances comprises transmitting a BGP extended community message comprising a subtype specifying local address information for the first set of virtual service instances provided by the first cloud data center of the plurality of cloud data centers.

15. The method of claim 13, further comprising transmitting, by the SDN controller and to the GLB device, a BGP extended community message comprising a subtype specifying address information for the DNS server for the domain.

16. The method of claim 13, wherein transmitting the hostname of the domain comprises transmitting a BGP capability message comprising a capabilities code specifying the hostname of the domain for which to perform load balancing across the plurality of cloud data centers.

17. The method of claim 13, wherein further comprising transmitting, by the SDN controller and to the GLB device, a BGP extended community message comprising a subtype specifying the load balancing algorithm to be applied to network traffic for the one or more of the virtual service instances provided by the plurality of cloud data centers.

18. The method of claim 17, wherein the subtype specifying the load balancing algorithm comprises a first subtype, and wherein the BGP extended community message further comprises:
  a second subtype specifying a maximum number of connections for the one or more of the virtual service instances provided by the plurality of cloud data centers; and
  a third subtype specifying a maintenance mode for the one or more of the virtual service instances provided by the plurality of cloud data centers.

19. A global load balancing (GLB) device of a first cloud data center of a plurality of cloud data centers that provide one or more virtual service instances configured to:
  receive, from a software-defined networking (SDN) controller for a service provider network, address information for a first set of virtual service instances provided by the first cloud data center of the plurality of cloud data centers;
  receive, from the SDN controller, a hostname of a domain for which to perform load balancing across the plurality of cloud data centers;
  request, from a domain name server (DNS) for the domain, address information for other sets of virtual service instances provided by other cloud data centers of the plurality of cloud data centers; and apply a load balancing algorithm to network traffic for the one or more of the virtual service instances provided by the plurality of cloud data centers.

20. The GLB device of claim 19, wherein the GLB device is further configured to establish a border gateway protocol (BGP) peer session with the SDN controller.

21. The GLB device of claim 20, wherein, to receive the address information for the first set of virtual service instances, the GLB device is further configured receive, from the SDN controller, a BGP extended community message comprising a subtype specifying local address information for the first set of virtual service instances provided by the first cloud data center of the plurality of cloud data centers.

22. The GLB device of claim 20, wherein the GLB device is further configured to receive, from the SDN controller, a BGP extended community message comprising a subtype specifying address information for the DNS server for the domain.

23. The GLB device of claim 20, wherein, to receive the hostname of the domain for which to perform load balancing across the plurality of cloud data centers, the GLB device is further configured to receive, from the SDN controller, a BGP capability message comprising a capabilities code specifying the hostname of the domain for which to perform load balancing across the plurality of cloud data centers.

24. The GLB device of claim 20, wherein the GLB device is further configured to receive, from the SDN controller, a BGP extended community message comprising a subtype specifying the load balancing algorithm to be applied to network traffic for the one or more of the virtual service instances provided by the plurality of cloud data centers.

25. A software-defined networking (SDN) controller for a service provider network configured to:
transmit, to a global load balancing (GLB) device of a first cloud data center of a plurality of cloud data centers that provide one or more virtual service instances, address information for a first set of virtual service instances provided by the first cloud data center of the plurality of cloud data centers;
transmit, to the GLB device, a hostname of a domain for which to perform load balancing across the plurality of cloud data centers; and
transmit, to the GLB device, a load balancing algorithm to be applied to network traffic network traffic for the one or more of the virtual service instances provided by the plurality of cloud data centers.

26. The SDN controller of claim 25, wherein the SDN controller is further configured to establish a border gateway protocol (BGP) peer session with the GLB device.

27. The SDN controller of claim 26, wherein, to transmit the address information for the first set of virtual service instances, the SDN controller is further configured to transmit a BGP extended community message comprising a subtype specifying local address information for the first set of virtual service instances provided by the first cloud data center of the plurality of cloud data centers.

28. The SDN controller of claim 26, wherein the SDN controller is further configured to transmit, to the GLB device, a BGP extended community message comprising a subtype specifying address information for the DNS server for the domain.

29. The SDN controller of claim 26, wherein, to transmit the hostname of the domain for which to perform load balancing across the plurality of cloud data centers, the SDN controller is further configured to transmit a BGP capability message comprising a capabilities code specifying the hostname of the domain for which to perform load balancing across the plurality of cloud data centers.

30. The SDN controller of claim 26, wherein further comprising transmitting, by the SDN controller and to the GLB device, a BGP extended community message comprising a subtype specifying the load balancing algorithm to be applied to network traffic for the one or more of the virtual service instances provided by the plurality of cloud data centers.

* * * * *